US010537870B2

(12) United States Patent
Qi et al.

(10) Patent No.: US 10,537,870 B2
(45) Date of Patent: Jan. 21, 2020

(54) METHANE CONVERSION DEVICE

(75) Inventors: Lai Qi, Los Angeles, CA (US); Ken Kuang, San Diego, CA (US)

(73) Assignee: TORREY HILLS TECHNOLOGIES, LLC, San Diego, CA (US)

( * ) Notice: Subject to any disclaimer, the term of this patent is extended or adjusted under 35 U.S.C. 154(b) by 411 days.

(21) Appl. No.: 13/398,724

(22) Filed: Feb. 16, 2012

(65) Prior Publication Data
US 2013/0192974 A1   Aug. 1, 2013

Related U.S. Application Data

(60) Provisional application No. 61/593,765, filed on Feb. 1, 2012.

(51) Int. Cl.
*B01J 19/12*   (2006.01)

(52) U.S. Cl.
CPC .................. *B01J 19/123* (2013.01)

(58) Field of Classification Search
CPC ...... B01J 19/123; B01J 19/242; B01J 19/006; B01J 19/2425; B01J 2219/0892; B01J 2219/00772; B01J 2219/0875; B01D 53/885; B01D 2257/7025; B01D 2255/20707; B01D 2258/06; Y02C 20/20
USPC ................. 422/244, 186.3, 22–24, 186–187; 204/155–158.21
See application file for complete search history.

(56) References Cited

U.S. PATENT DOCUMENTS

| | | | | |
|---|---|---|---|---|
| 1,367,090 A * | 2/1921 | Pole | ................................ | 422/24 |
| 2,501,290 A * | 3/1950 | Pequignot | .................. | 422/186.3 |
| 2,747,101 A * | 5/1956 | Hammond, Jr. | ................. | 422/24 |
| 3,011,230 A * | 12/1961 | Potapenko | ..................... | 422/121 |
| 3,870,495 A * | 3/1975 | Dixson et al. | .................. | 55/489 |
| 4,110,183 A * | 8/1978 | Furuta et al. | ............... | 204/157.3 |
| 4,156,652 A * | 5/1979 | Wiest | .......................... | 422/186.3 |
| 4,816,121 A * | 3/1989 | Keefer | ................... | B21D 39/04 518/722 |
| 5,116,582 A * | 5/1992 | Cooper et al. | ............. | 422/186.3 |
| 5,865,959 A | 2/1999 | Meinzer et al. | | |
| 5,954,925 A * | 9/1999 | Sherman | ..................... | 204/157.9 |
| 6,156,211 A * | 12/2000 | Gonzalez-Martin et al. | ............... | 204/157.9 |
| 6,238,631 B1 * | 5/2001 | Ogata | ................... | B01D 53/007 422/186.3 |
| 6,399,022 B1 * | 6/2002 | Schuler et al. | ................. | 422/24 |

(Continued)

FOREIGN PATENT DOCUMENTS

CA   2249966 A1   4/2000
EP   1483972 A1 *  12/2004

(Continued)

OTHER PUBLICATIONS

Machine translations of description and claims for EP 1483972 A1.*
EP13153653.4 Extended Search Report dated Jun. 28, 2013.

Primary Examiner — Nicholas A Smith
Assistant Examiner — Colleen M Raphael
(74) Attorney, Agent, or Firm — Chang-Hsing Liang

(57) ABSTRACT

Provided herein are methane conversion devices comprising a filter means (e.g., one or more filters), a circulation means (e.g., one or more circulating pumps), a reaction means (e.g., one or more reactor assemblies), a control means (e.g., central process unit, thermo-controller, UV controller, and the like), an energy supply means (e.g., ultra-violet lamp, direct sunlight, heating assembly, and the like).

11 Claims, 6 Drawing Sheets

(56) References Cited

U.S. PATENT DOCUMENTS

| | | | |
|---|---|---|---|
| 6,464,936 B1 * | 10/2002 | Mowat et al. | 422/24 |
| 6,475,944 B1 * | 11/2002 | Yang | B01D 53/8628 |
| | | | 502/84 |
| 6,555,011 B1 * | 4/2003 | Tribelsky et al. | 422/186.3 |
| 6,596,230 B1 * | 7/2003 | Woo et al. | 422/24 |
| 6,773,683 B2 * | 8/2004 | Elliott et al. | 422/186.3 |
| 7,220,391 B1 * | 5/2007 | Huang et al. | 422/186.03 |
| 7,645,934 B1 * | 1/2010 | Fidanza | H01L 31/036 |
| | | | 136/263 |
| 7,658,891 B1 * | 2/2010 | Barnes | 422/186.03 |
| 7,842,264 B2 * | 11/2010 | Cooper | B01D 47/06 |
| | | | 422/168 |
| 8,529,831 B1 * | 9/2013 | Ho | B01D 53/007 |
| | | | 422/120 |
| 9,242,873 B2 * | 1/2016 | Shang | B01J 21/063 |
| 9,566,565 B2 * | 2/2017 | Grothe | B01J 35/023 |
| 2001/0026452 A1 * | 10/2001 | Ganzer et al. | 362/470 |
| 2002/0029955 A1 * | 3/2002 | Sahle-Demessie et al. | 422/186 |
| 2002/0175067 A1 | 11/2002 | Sherwood | |
| 2003/0042126 A1 | 3/2003 | Nguyen et al. | |
| 2003/0205454 A1 | 11/2003 | Hlavinka et al. | |
| 2004/0007453 A1 * | 1/2004 | Scahill | B01D 53/885 |
| | | | 422/186.3 |
| 2005/0044847 A1 * | 3/2005 | Twigg | 422/186.3 |
| 2005/0196331 A1 * | 9/2005 | Dove | 422/186.07 |
| 2006/0076506 A1 * | 4/2006 | Duthie, Jr. | 422/24 |
| 2006/0159598 A1 * | 7/2006 | Wu | A61L 9/205 |
| | | | 422/186.3 |
| 2006/0204413 A1 * | 9/2006 | Pawlak | C07C 29/50 |
| | | | 518/726 |
| 2007/0196252 A1 * | 8/2007 | Pawlak | C07C 29/50 |
| | | | 422/224 |
| 2007/0218264 A1 * | 9/2007 | Gueneau | C03C 17/3417 |
| | | | 351/159.62 |
| 2007/0284303 A1 * | 12/2007 | Drew | B01D 67/0002 |
| | | | 210/505 |
| 2008/0261056 A1 * | 10/2008 | Labrousse | C03C 8/12 |
| | | | 428/447 |
| 2009/0021925 A1 * | 1/2009 | Heimann et al. | 361/818 |
| 2009/0180941 A1 * | 7/2009 | Vanderspurt | B01J 35/004 |
| | | | 422/120 |
| 2010/0025337 A1 | 2/2010 | Yencho | |
| 2010/0075836 A1 * | 3/2010 | Hugener-Campbell | B01D 53/8687 |
| | | | 502/159 |
| 2011/0003085 A1 * | 1/2011 | Hugener-Campbell | C01B 33/18 |
| | | | 427/458 |
| 2011/0215055 A1 * | 9/2011 | Baron | 210/748.1 |
| 2011/0318237 A1 | 12/2011 | Woodling et al. | |
| 2012/0183443 A1 * | 7/2012 | Hurley | 422/121 |
| 2012/0201717 A1 * | 8/2012 | Singh | C01B 3/34 |
| | | | 422/162 |

FOREIGN PATENT DOCUMENTS

| | | | |
|---|---|---|---|
| WO | WO-2000-40530 A1 | 7/2000 | |
| WO | WO 2009067080 A1 * | 5/2009 | B01F 7/00208 |
| WO | WO-2009147126 A1 * | 12/2009 | B82Y 20/00 |
| WO | WO-2010-055288 A1 | 5/2010 | |

\* cited by examiner

2A

2B

2C

5A

5B

6A

6B

METHANE CONVERSION DEVICE

CROSS-REFERENCE

This application claims the benefit of U.S. Application No. 61/593,765, filed Feb. 1, 2012, which application is incorporated herein by reference in its entirety.

BACKGROUND OF THE INVENTION

Flammable/explosive gases are serious hazards in nearly every sector of the energy industries, such as methane in coal, oil and gas industries, and ethylene and acetylene in petrochemical industries. These explosive gases have low explosion limits in air, typical between 3-30%, which makes those explosive hazards very easy to form but uneconomical to handle. Energy industries are trillion-dollar industries. Thousands of workers die each year globally in explosion related accidents.

SUMMARY OF THE INVENTION

In one aspect, the present invention provides a photocatalytic reactor used for methane conversion comprising spiraling separation fins, a cylindrical chamber sleeve and a UV lamp.

In another aspect, the present invention provides a methane conversion device comprising a filter means for removing or reducing the amount of non-gas materials (e.g., one or more filters), a circulation means for circulating the filtered gas (e.g., methane) in the gas conversion devices and/or transporting the gas (i.e., methane) to a reaction means (e.g., one or more circulating pumps), a moisturizer, a reaction means for reacting methane under suitable conditions for methane conversion (e.g., one or more reactor assemblies), and a condenser/collector optionally comprising a control means for integrating and/or controlling all other means to provide suitable reaction conditions (e.g., a central process unit, a thermo-control unit, a UV controller, and the like).

The reactor assembly (e.g., a photocatalytic reactor or an individual photocatalytic oxidation (PCO) system), in some embodiments, is a metal cylinder, within which a ultra-violet (UV) lamp tube is concentrically located. Gas flow is forced through the gap space between the UV lamp and the metal cylinder in a spiral manner by the presence of spiraling separation fins. The surface of the fins and the inner side of the cylinder is coated with catalyst nanoparticles, comprising, for example, titanium dioxide ($TiO_2$), or other suitable catalyst such as $WO_3$, NiO, and the like. In some embodiments, the reactor assembly comprises multiple reactor tubes whose gas flow paths are inter-connected both in serial and parallel through elbow tubes. In some embodiments, the device comprising the reactor assembly operates at ambient condition and all the electronic components are explosion-safe, ideal for underground applications.

In another aspect provides methods of methane conversion comprising intaking methane containing gases to a reactor assembly which comprises one or more photocatalytic reactors. In one aspect, the gases flow in a helix manner following the spiral path along the UV lamp surface through the photocatalytic reactors. In another aspect, the inner surface of the cylinder sleeve and the surface of the spiraling separation fins are coated with photo catalyst particles comprising $TiO_2$.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2A is a cut view of an exemplary reactor assembly (e.g., an individual photocatalytic oxidation (PCO) system 100). The system comprises a UV lamp tube 102 which is concentrically located within a larger cylinder (e.g., PCO chamber 103). The gap space between the lamp tube 102 and the cylinder is separated by spiraling separation fins 104 (see FIG. 2B), which guides gas stream to flow in a helix manner along the lamp tube surface. Gas stream flows in through the inlet hole at one end of the cylinder and out through the outlet hole 105 at the other end. The inner surface of the cylinder and the surface of the fins are coated with catalyst nanoparticles 106. FIG. 2B shows open view of the two halves of the PCO reactor. FIG. 2C shows top view of the reactor assembly. Center hole is for UV lamp insertion. The spiral path of the air groove can be seen.

FIG. 5A shows a smooth coating can be achieved on large areas. FIG. 5B provides a close view of the embedded large pores. Nano-porosity between individual P25 nanoparticles is distinguished in the photo.

FIG. 6A provides side view of the $TiO_2$ coating. Macro pores are uniformly formed through the film thickness, which make the coating more accessible to both UV light and gas molecules. FIG. 6B shows illustrative results that measure the porosity distribution by mercury porosimetry. Results show template $TiO_2$ coatings have clearly a porosity of dual sizes. The larger size is derived from the removal of polystyrene microbeads.

DETAILED DESCRIPTION OF THE INVENTION

Figure 1:
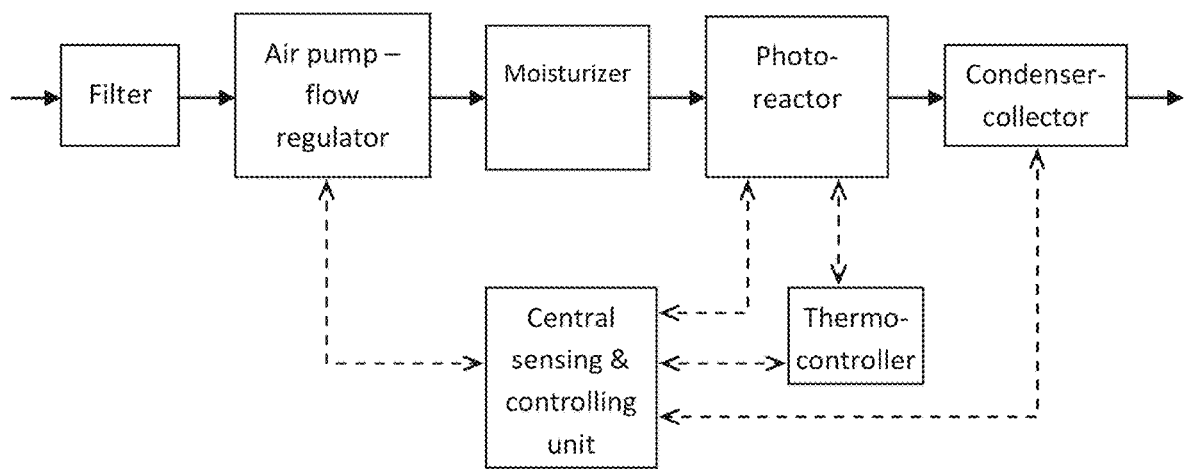
FIG. 1 is a flowchart of the photocatalytic system. Solid arrow lines indicate the direction of gas stream flow. The dotted arrow lines indicate controlling signal and sensing feedback loops.

The present invention is directed to methane conversion devices or systems. In some embodiments provide methane conversion devices or systems that utilize a reactor assembly whose gas flow paths are inter-connected with a conversion means for gas conversion.

The invention described herein can be applied to gases other than methane. For example, the devices, reactor assemblies, systems, kits and methods could be used to convert explosive or toxic gases to non-explosive or less toxic gases.

Flammable and/or explosive gases are serious hazards in nearly every sector of the energy industries. The explosive gases (e.g., methane in coal, oil and gas industries; ethylene and acetylene in petrochemical industries) have low explosion limits in air, typical between 3-30%, which makes these explosive hazards very easy to form but uneconomical to handle. Currently, ventilation of these hazardous gases is the main method, because the explosive nature of these gases and the high cost association with other possible means.

In some embodiments, the devices provided herein are used to remove explosive or toxic gases such as methane from working environment (e.g., underground coal mine atmosphere), where the presence of these gases threats the safety and health of workers. Ventilation Air Methane (VAM) is the methane ($CH_4$) component in an underground coal mine atmosphere. VAM is naturally formed within coal seams and released during mining. VAM is the main cause of explosion incidents that usually result in fatalities and significant asset loss. Due to the high chemical stability of $CH_4$, the technical difficulty in gas separation and the sensitive nature of coal mine operations, currently the only available practice is to dilute methane with a large amount of air through ground-installed powerful ventilation system. However, such process is not always sufficient enough. The vast complexity of underground mine networks makes ventilation difficult, where numerous dead-ends and corners of the underground mine networks make air flow stagnant. Sudden release of $CH_4$ from coal seams happens frequently and unexpectedly, which may easily raise local methane concentration into the explosive range, 5-15%. In case of such a situation, the only available solution is to shut down the facility and evacuate miners. Moreover, methane is a strong greenhouse gas with a high global warming potential that is 20 times higher than that of $CO_2$. The current way of direct release of VAM into atmosphere is causing more environmental issues. If VAM can be captured before release, it will considerably reduce the total greenhouse gas emission.

In some embodiments provide a safe, portable, low-power and stand-alone VOC-capturing system or device, which can be operated at ambient conditions and deployed underground. In some embodiments, the system utilizes photocatalytic oxidation (PCO) approach, which employs UV-illuminated nanocrystalline catalysts (e.g., $TiO_2$) plus unique reactor designs. In some embodiments provide a methane conversion device comprising a filter, a circulating pump, a moisturizer, a reactor assembly and a gas condenser/collector. In certain embodiments, the methane conversion device further comprises a thermal control unit and central process unit.

In some embodiments, there are provided methane conversion devices comprising a filter, a circulating pump, a moisturizer, a reactor assembly and a gas condenser/collector. In some embodiments, the device further comprising a thermal control unit and central process unit. In certain embodiments, the reactor assembly comprises one or more reactors.

Referring to FIG. 1, the invented system comprises following units: a filter unit, a circulation pump, a moisturizer unit, a reactor assembly unit, a condenser/collector unit, a thermal control unit and a central sensing controlling unit. The filter unit comprises multiple filters to remove dusts and airborne particles from gas stream. Exemplary filters include Hemp filters and the like, or other suitable filters. The circulation pump intakes gas (after filtering) from surrounding environment and feeds into the moisturizer unit through a bubbler. The moisturizer contains aqueous solutions that can effectively absorb chemicals (such as sulfur), and/or adds into the gas stream with water vapor. When sulfur burns in air it produces sulfur dioxide. In water, this gas produces sulfurous acid and sulfites. These acids harm the lungs, eyes or other tissues at high concentrations. In addition, the corrosive sulfur may react with the metal components and damage the device. The temperature of the reactor assembly is kept in a preset range to ensure optimum reaction conditions. The condenser/collector unit absorbs oxidized species, such alcohols or aldehydes. Harmless $CO_2$ will be released.

In some embodiments, the device or system further comprises a control means (e.g., a thermal control unit and a central sensing & controlling unit as shown in FIG. 1) The control means comprises central controlling unit that controls proper gas circulation, energy supply and efficient reaction conditions so methane can be properly converted. The controller means may include one or more units, e.g., a central sensing unit (e.g., an air flow sensor), a central controlling unit (e.g., a computer), and/or energy controlling unit (e.g., thermo-controller), and the like. The thermal control unit controls the temperature of the reactor assembly. Once temperature above the preset upper limit, signal will be sent to the central process unit to cut off the power to the UV lamps. The central process unit monitors and controls all the other units and provides a displaying and operating interface.

In some embodiments, the circulation pump intakes gas from surrounding environment (with or without filtering) and feeds the gas into the moisturizer unit through a bubbler. In some embodiments, the moisturizer comprises aqueous solutions that absorb chemicals comprising sulfur.

PCO reactions are typically low-efficiency reactions due mainly to the nature of light. Light is of low energy density and much less penetrative than heat and electromagnetic field. It will be stopped by the first opaque surface it met. So, PCO reaction is heterogeneous surface reaction, not a volumetric one. The useful surface space of solid particles accounts for only a tiny portion of the volume they occupy. This is also the reason that efficiency of PCO is less than that of thermal catalytic oxidation. Due to this intrinsic limitation, the most feasible way to enhance PCO efficiency is to increase the interaction between reactants ($CH_4$, $O_2/H_2O$) and catalyst surface.

In some embodiments, the flow reactor adopts spiral air grooves that surround the UV lamp. The helix movement of gas molecules forces them to flow against the groove surface that is coated with catalysts (e.g., $TiO_2$).

Figure 2A:
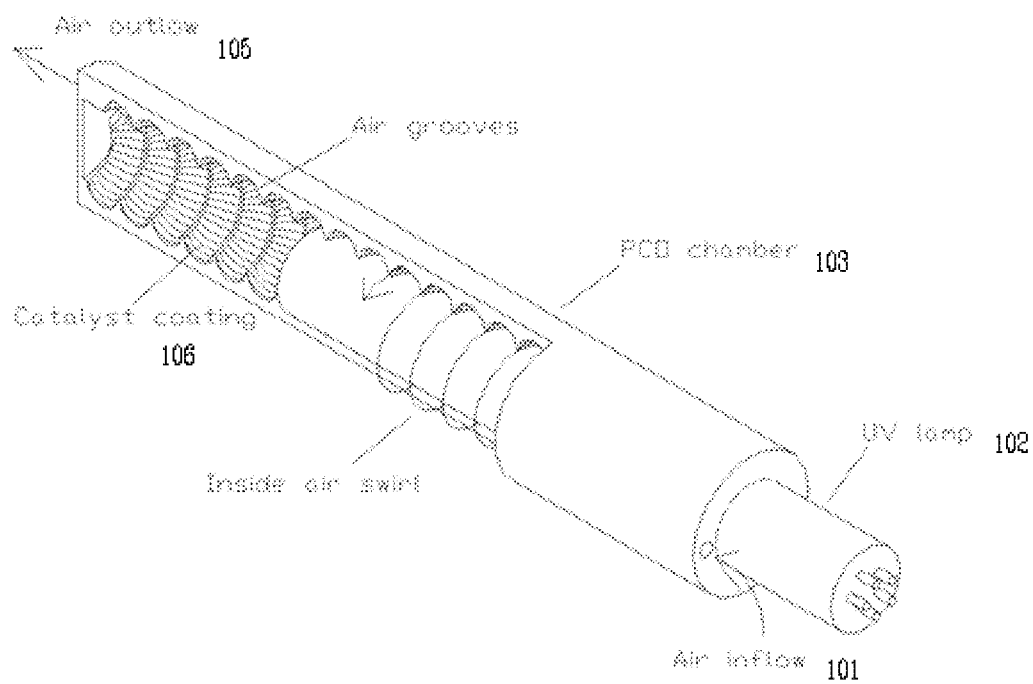
FIG. 2A-C show an exemplary reactor assembly.
Figure 2B:
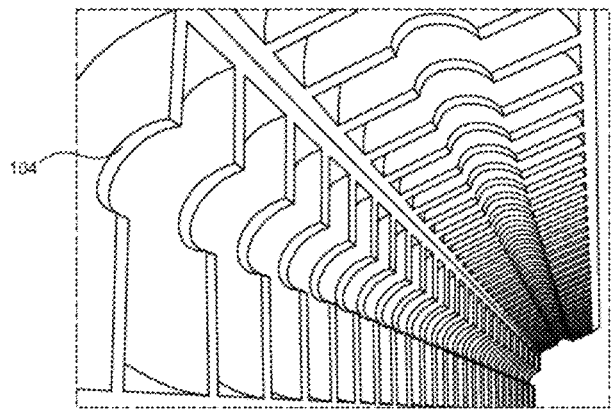
Figure 2C:
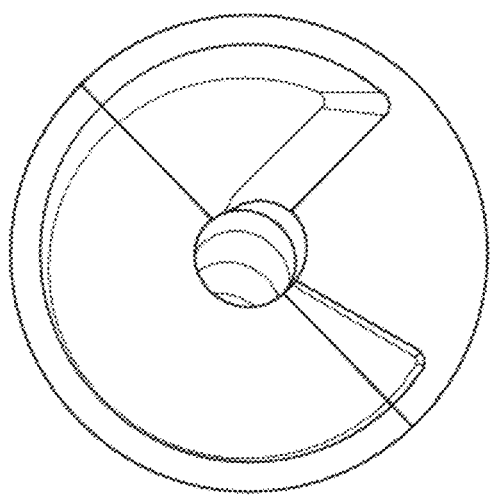

An exemplary reactor assembly (e.g., a photocatalytic reactor) in accordance with the present invention is illustrated in FIG. 2A-2C. FIG. 2A shows the construction details of the invention photo reactor 100. Gas stream with undesirable gases components flow in from the inlet hole 101 at one end into the reactor chamber 103. Spiraling separation fins 104 (see FIG. 2B) stand between a chamber sleeve and the UV lamp 102 forming a spiral path for gas stream to flow in a helix manner along the UV lamp surface (as indicated as air grooves in FIG. 2A). The helix gas path is critical for maintaining high contact rates of gas molecules with catalyst surface. Also, the flow of gas stream helps to cool down UV lamp. FIG. 2B shows an open view of the two halves (together forming spiraling separation fins 104) of the PCO reactor. FIG. 2C shows top view of the reactor assembly.

Center hole is for UV lamp insertion. The spiral path of the air groove can be seen. In some embodiments, provided herein are photocatalytic reactors comprising spiraling separation fins, a chamber sleeve and a UV lamp wherein the spiraling separation fins stand between a chamber sleeve and the UV lamp forming a spiral path. In certain embodiments, the gas stream flow in a helix manner following the spiral path along the UV lamp surface. In certain embodiments, the inner surface of the cylinder sleeve and the surface of the spiraling separation fins are coated with photo catalyst particles 106 comprising $TiO_2$. In certain embodiments, the particles are nanoparticles.

The reactor chamber can be made from a variety of metals and alloys, including aluminum, iron, copper, titanium or any alloys containing those metals. The UV lamp has a broad emission spectrum from short UV to visible with peak wavelength less than 390 nm. The inner surface of the reactor cylinder and the surface of the separation fins are coated with catalyst nanoparticles, which in some embodiments, are composed of titanium dioxide.

Figure 3:
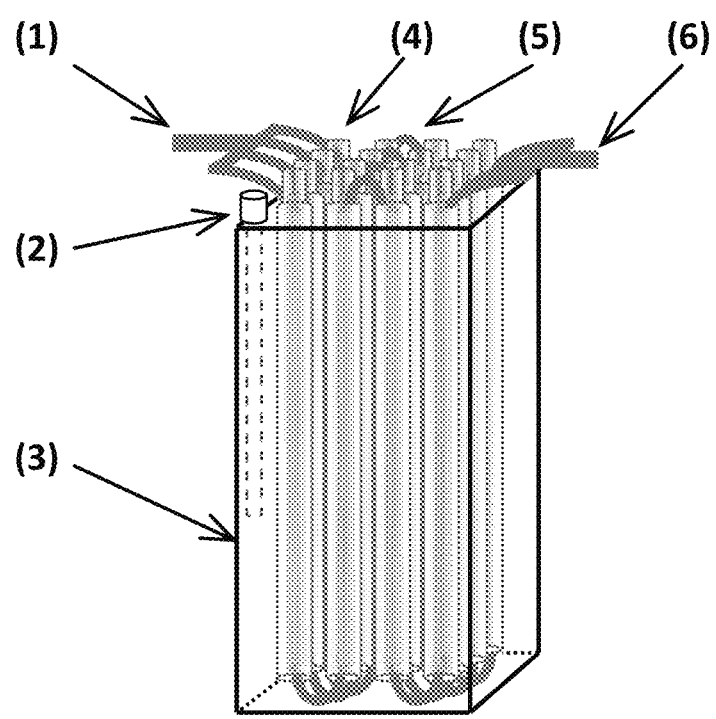
FIG. 3 is a perspective view of an exemplary reactor assembly for PCO system where multiple reactor tubes are interconnected in both serial and parallel through elbow tubes. (1) Inlet flow distribution pipeline; (2) temperature sensing and thermocouple unit; (3) assembly container; (4) UV lamp tube; (5) elbow connector tube; (6) outlet flow pipeline.

In some embodiments, the reactor assembly comprises multiple reactor cylinders. For example, referring to the construction detail of reactor assembly of FIG. 3, each reactor assembly comprises multiple reactor cylinders, which are interconnected in both serial and parallel through connector tubes (i.e., elbow tubes). FIG. 3 shows (1) inlet flow distribution pipeline; (2) temperature sensing and thermocouple unit; (3) assembly container; (4) UV lamp tube; (5) elbow connector tube; (6) outlet flow pipeline. Individual reactor cylinders are connected in serial to increase reaction time and consequently to increase conversion efficiency. Individual reactor cylinders are connected in parallel to increase flow rate to meet deployment requirement. The numbers of reactors in serial or parallel can be varied to achieve the optimum combination of flow rate and reaction time.

Figure 4:
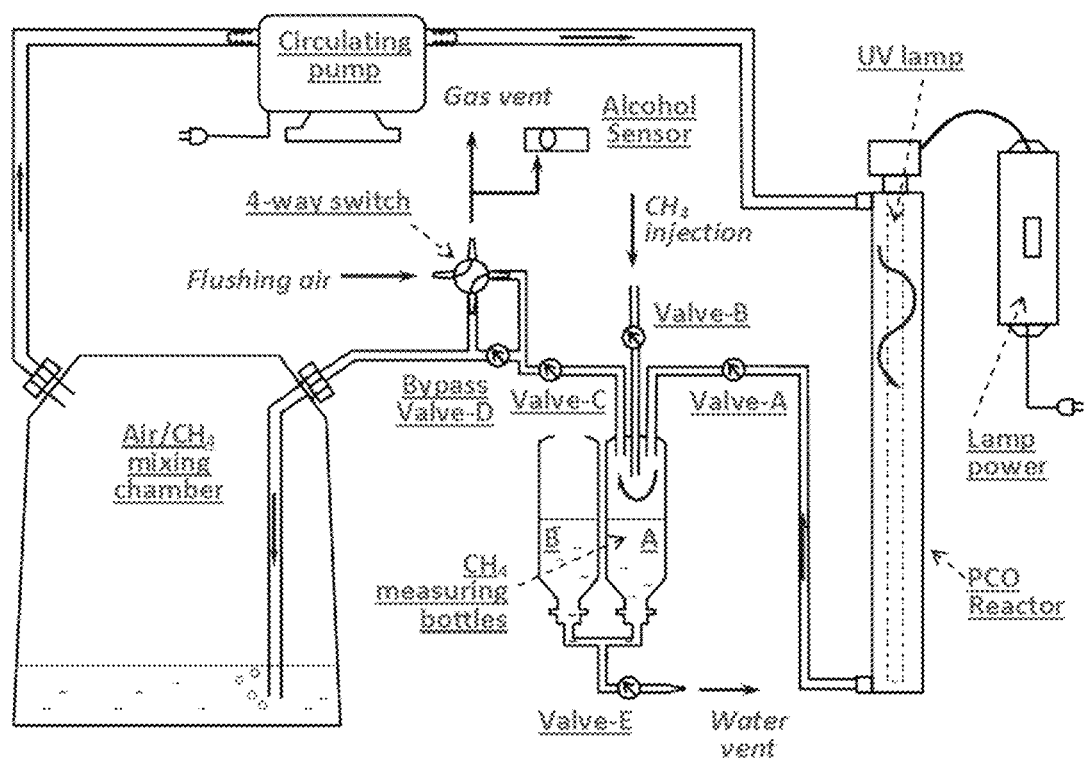
FIG. 4 illustrates an exemplary operating mechanism of the PCO system.

To further illustrate how an exemplary device is working, FIG. 4 is provided as a non-limited operating mechanism of the PCO system.

FIG. 4 shows the operating mechanism of the prototype system. Before reaction, Valves-A and -C are closed. Pure $CH_4$ gas is injected through Valve-B into Bottle-A of the twin measuring bottles, each of which has a capacity of 2 liter and contains 1 liter of water that is connected through tubing at the bottom. When $CH_4$ gas is injected in Bottle-A, the water in it is pushed into Bottle-B. When all the water in Bottle-A enters Bottle-B (Bottle-B starts bubbling), Valve-B is closed and exactly 1 liter of $CH_4$ gas has been added to the gas loop. Valve-A and -C will then be opened to let gases to mix by turning on the air pump. After 5 minutes mixing, the PCO reaction starts by turning on the UV lamp. After a pre-determined time of reaction, the 4-way gas switch was switched to the VENT mode to break the circulation. Effluent gas can be collected in one of the outlets. Liquid samples can be collected from the water trap in the 5-gallon Air/$CH_4$ mixing chamber.

For each test, a pre-determined amount of methane gas (1 liter) is injected into the loop and mixed with the inside air (23 liters). Circulation under UV light illumination is controlled for a pre-determined time period. A water trap is installed within the loop (in the Air/$CH_4$ mixing chamber), which serves 2 purposes: adding water vapor to the reaction and collecting soluble oxidized species including methanol, formaldehyde and formic acid.

Built for Safety 5-15% methane in air mix is highly explosive. In coal mine operation, the maximum methane concentration allowed is 1%. When actual reading goes beyond 1%, whole or partial operation must be shutdown and miners must be evacuated. Due to safety concern, in some embodiments, 4% of methane in air is set for design invention gas conversion device for methane removal, which is low enough to avoid explosion danger but high enough to yield adequate oxidized species for detection. In some embodiments, there are other built-in safety measures as well. In case of pressure buildup within the system, gas will escape the loop through the water in the measuring Bottle-B, which acts as a pressure breaker. Also, most parts of the system are made of flexible plastics, which will expand upon pressure. So, in extreme cases that unexpected violent reactions occur, the pressure will be quickly released rather than reaching dangerously high levels.

Design for Easy Operation

A major benefit of adopting a circulating mode is the flexibility in controlling the reaction time, the single most important factor deciding the oxidation rate. The gas reaction time (GRT) is defined as the time period that gas stays in the reactor. It is calculated by dividing the total reactor length by the gas flow rate, $$GRT = n \times L \times S / FR$$

where, n is the number of reactors (or # of cycles). L is the length of air path in a single reactor. S is the cross-section area of the air path in the reactor. FR is the gas flow rate in the loop. The gas flow rates are usually fixed by the capacity of air pump used. Both L and S are fixed as well after fabrication. Thus, the only way to change the reaction time is by varying the number of reactors.

It is very convenient to control the reaction time even with a single reactor, i.e. just circulating for different time periods. For example, the air pump used has a nominal capacity of 11 liter/min without load. After loading (connected in the loop), the pump is set to a flow rate of 4 liter/min. The whole gas capacity of the system is 23 liters of air plus 1 liter of methane. As such, it takes about 6 minutes to pass all the gas through the reactor once, which is defined it as ONE cycle. If 20 reactors are simulated, 120 minutes (6×20=120) of reaction time is needed. Another benefit for adopting the circulating mode is that it saves manufacturing cost and time considerably.

In typical PCO reactions, an important factor is the accessible surface area of catalysts. In some embodiments, the catalyst is selected from the group consisting of TiO2, metal-ion doped $TiO_2$ (e.g., Pt-doped $TiO_2$), $WO_3$, $NiO^+$, $ScO^+$, $TiO^+$, $VO^+$, $CrO^+$, $MnO^+$, $FeO^+$, $CoO^+$, $CuO^+$, ZnO, metal on silica (e.g., V/$SiO_2$), silicates, and combinations thereof. Although commercial $TiO_2$ nanoparticles (P25, Degussa) have high specific surface area (SSA) (e.g., 30-50 $m^2/g$) the actual accessible surface area after coating and sintering will be much less. After sintering, pores of the films are of sizes similar to that of the particles. As such, films of P25 $TiO_2$ nanoparticles are mainly composed of pores of 30-50 nm when using commercial $TiO_2$ nanoparticles (P25, Degussa). For such tiny pores, the driving force for gas molecules to penetrate is diffusion, which is slow. In accordance with the present invention, catalyst coatings have larger pores that allow quick gas penetration through dynamic air pressure fluctuation, which will considerably increase the solid/gas interaction.

Figure 5A:
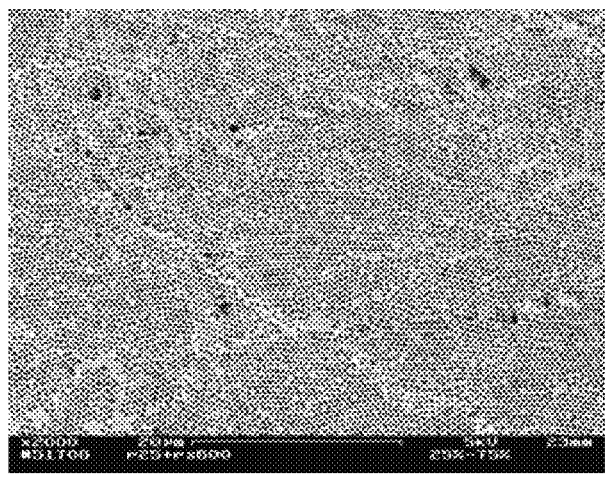
FIG. 5A-B show SEM micrographs of the surface of the exemplary catalyst coating (e.g., $TiO_2$).
Figure 5B:
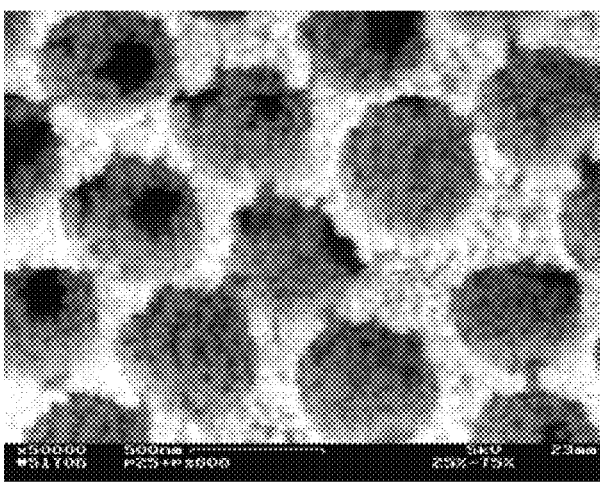
Figure 6A:
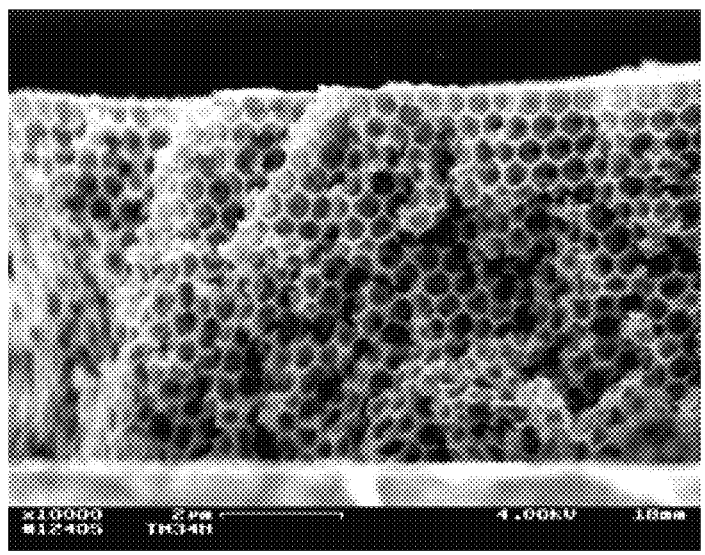
FIG. 6A-B show the scanning electronic microscopy images of the exemplary surface of the catalyst coating (e.g., $TiO_2$).
Figure 6B:
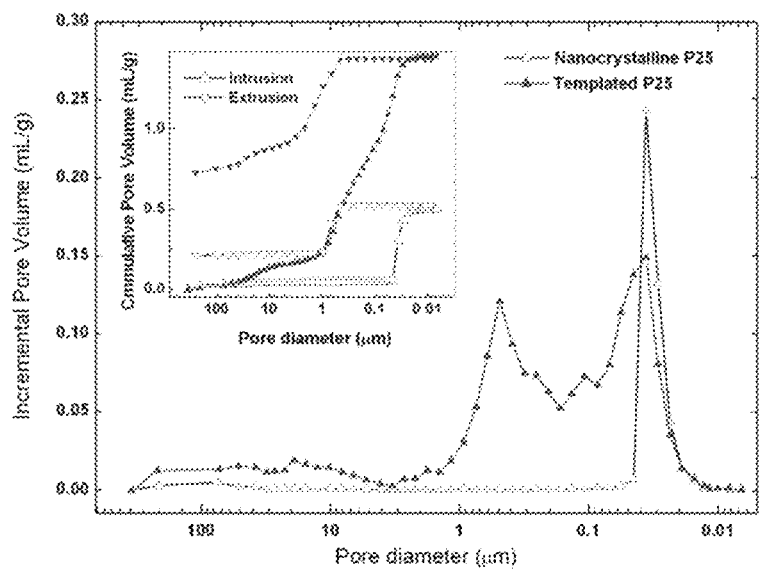

FIG. 5A/B and FIG. 6A/B show the scanning electronic microscopy images of the exemplary surface of the $TiO_2$ coating. Large pores derived from removal of the micro beads can be clearly distinguished. The larger interconnected pore networks can significantly enhance the accessibility of inner surface to both gas molecules and UV photons. Polystyrene micro beads were used as templates to create interconnected porous network within the coatings.

Estimated gas conversion rate can be done by detection of methanol, CO and/or $CO_2$ after reaction. For example, in the case of a 20-min reaction (equivalent to 3.3 cycles), 8 ppm of MeOH was detected in the water of the methane/air mixing chamber. 8 ppm MeOH in 1 gal of water equals to a yield of 0.94 μmol of MeOH and one liter of methane gas equals to 44.6 μmol. Upon conversion, 2.1% of the original methane was converted to MeOH after 3.3 cycles. After considering the formation of CO2 and CO, the exemplary device has a unit conversion rate of 2.7% to 3.0%.

In some embodiments, the circulation pump intakes gas at the flow rate to yield optimized methane conversion efficiency. In some embodiments, the optimized methane conversion efficiency is measured by unit conversion rate at about 2% to about 15% per cycle. In some embodiments, the unit conversion rate of the invention photocatalytic oxidation (PCO) system or device is about 3%, about 4%, about 5%, about 6%, about 7%, about 8%, about 9%, about 10% per cycle. In some embodiments, the unit conversion rate of the invention photocatalytic oxidation (PCO) system or device is about 2% to about 15%, about 3% to 12%, about 5% to 10% or 8% to 10% per cycle.

An ordinary skilled in the art would readily apply the suitable catalysts for conversion of the volatile toxic industrial chemicals. For example, sulfur dioxide can be removed utilizing a platinum, palladium, nickel or silver coated reactor with spiraling separation fins similar to FIG. 2A-2C. The UV-lamp may be replaced with other suitable energy sources.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A methane conversion device comprising a reactor assembly which comprises one or more photocatalytic reactors comprising spiraling separation fins standing between a cylindrical chamber sleeve and a UV lamp, configured to form a spiral path for gas stream to flow in a helix manner along the UV lamp surface, a condenser collector configured to condense and collect methane gas oxidized species, and a moisturizer, wherein the inner surface of the cylindrical chamber sleeve and the surface of the spiraling separation fins are coated with catalyst nanoparticles characterized with a porosity of dual sizes wherein large one of the dual sizes has pore size in a range between 0.16 μm to 1.50 μm and interconnected pore networks for methane conversion.

2. The device of claim 1, further comprising a filter, and a circulating pump.

3. The device of claim 2, further comprising a thermal control unit and central process unit.

4. The device of claim 2, wherein the filter is a hemp filter.

5. The device of claim 2, wherein the circulation pump intakes gas from surrounding environment and feeds the gas into the moisturizer unit through a bubbler.

6. The device of claim 2, wherein the moisturizer comprises aqueous solutions that absorb chemicals comprising sulfur.

7. The device of claim 5, wherein the circulation pump intakes gas at a flow rate that yields an optimized methane conversion efficiency.

8. The device of claim 7, wherein the optimized methane conversion efficiency is measured by unit conversion rate at about 2% to about 15% per cycle.

9. The device of claim 2, wherein the moisturizer generates water vapor.

10. The device of claim 1, wherein the photocatalytic reactors interconnect both in serial and in parallel with connector tubes.

11. The device of claim 1, wherein the nanoparticles comprise $TiO_2$.

* * * * *